(12) United States Patent
Hsuan et al.

(10) Patent No.: US 8,379,619 B2
(45) Date of Patent: Feb. 19, 2013

(54) SUBCARRIER PERMUTATION TO ACHIEVE HIGH FREQUENCY DIVERSITY OF OFDMA SYSTEMS

(75) Inventors: Yi Hsuan, Sunnyvale, CA (US); Yang-Seok Choi, Portland, OR (US); Hujun Yin, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 232 days.

(21) Appl. No.: 12/660,994

(22) Filed: Mar. 9, 2010

(65) Prior Publication Data

US 2011/0110342 A1    May 12, 2011

Related U.S. Application Data

(60) Provisional application No. 61/259,086, filed on Nov. 6, 2009.

(51) Int. Cl.
*H04B 7/208*    (2006.01)

(52) U.S. Cl. .......................................... 370/344; 370/208
(58) Field of Classification Search .................. 370/338, 370/344
See application file for complete search history.

(56) References Cited

U.S. PATENT DOCUMENTS

| 2010/0110874 A1* | 5/2010 | Kang et al. | 370/208 |
| 2010/0303004 A1* | 12/2010 | Mueck et al. | 370/328 |
| 2011/0013613 A1* | 1/2011 | Sung et al. | 370/338 |

* cited by examiner

*Primary Examiner* — Mark Rinehart
*Assistant Examiner* — Matthew Hopkins
(74) *Attorney, Agent, or Firm* — Thorpe North & Western, LLP

(57) ABSTRACT

An embodiment of the present invention provides a method of improving subcarrier permutation to achieve high frequency diversity of OFDMA systems in wireless networks, comprising introducing different tone selections for different symbols, such that if a channel has only a few tones in each symbol of a resource unit it can still have sufficient frequency diversity.

12 Claims, 2 Drawing Sheets

SUBCARRIER PERMUTATION TO ACHIEVE HIGH FREQUENCY DIVERSITY OF OFDMA SYSTEMS

CROSS REFERENCE TO RELATED APPLICATIONS

This application claims priority to provisional patent application No. 61/259,086, filed Nov. 6, 2009, entitled "Improved subcarrier permutation to achieve high frequency diversity of OFDMA systems".

BACKGROUND

In advanced wireless communication systems, orthogonal frequency division multiplexing (OFDMA) is a popular and efficient multiple access technology. Data can be transmitted in two types of resources in OFDMA: contiguous resources and diversity resources. When using diversity resources, OFDM tones in a particular physical channel should be distributed over the entire frequency band so that frequency diversity can be achieved for that channel. A resource unit for diversity mode transmission is usually created by choosing a certain number of tones from different parts of the frequency band. For example, in the Institute for Electronic and Electrical Engineers (IEEE) P802.16m/D2, the process of tone-selection is done in the frequency domain to form blocks of 16 tones and the process is performed symbol by symbol to form 16 tone by 6 symbol resource units.

This general procedure can become a problem if the process is the same or almost the same symbol by symbol. The reason is that some physical channels are small in size and do not occupy the entire resource unit. The channel can only occupy very few tones per symbol. In this case, if the tone-selection process is the same over time (i.e. over different symbols), the channel may be composed of tones with little or no frequency diversity at all.

Thus, a strong need exists for techniques that use an improved subcarrier permutation to achieve high frequency diversity of OFDMA systems.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
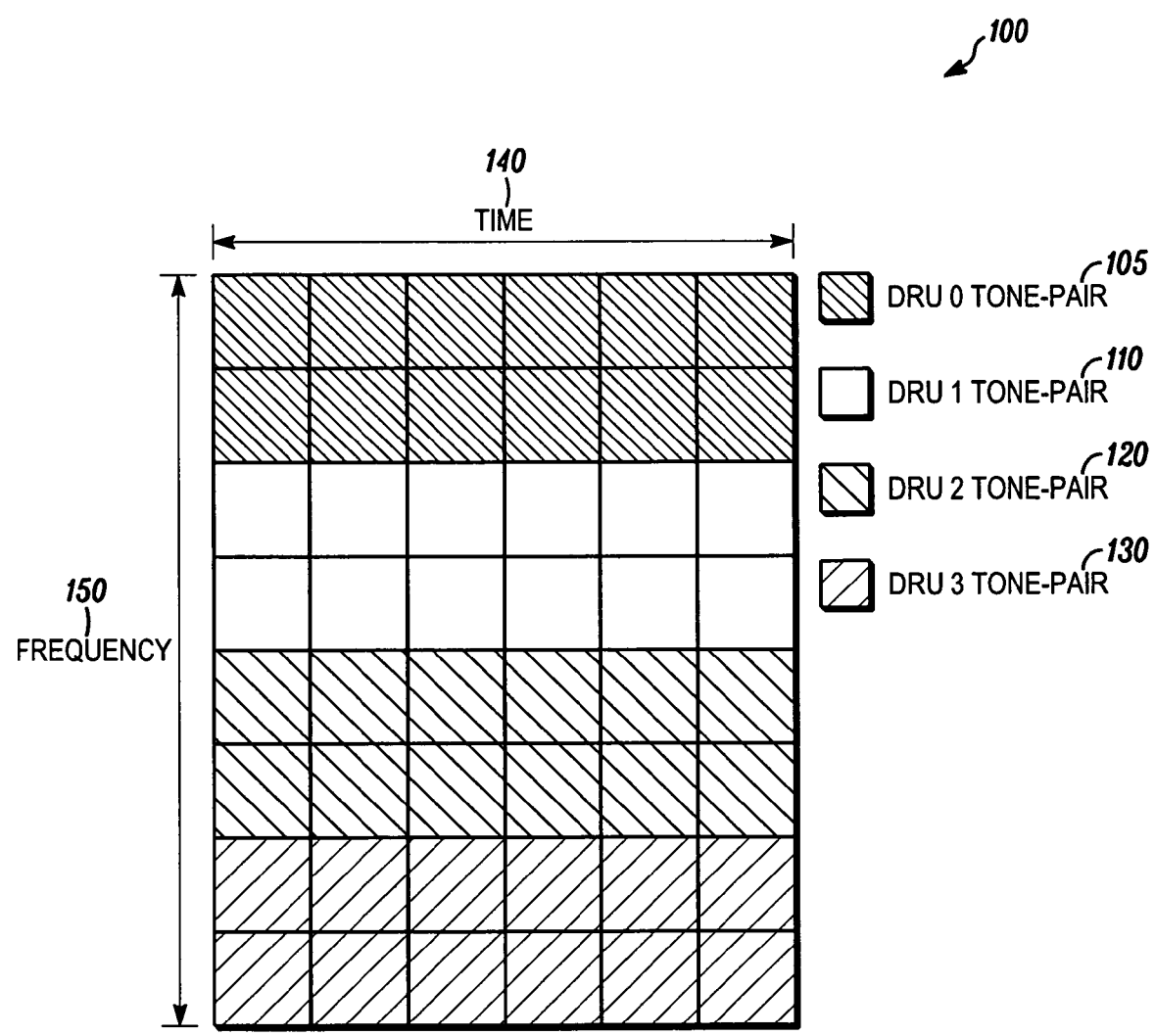
FIG. 1 provides an example of a distributed resource unit based on IEEE P802.16m/D2 subcarrier permutation.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Embodiments of the present invention provide different tone selection (also known as subcarrier permutation) for different symbols, such that if a channel has only a few tones in each symbol of a resource unit it can still have enough frequency diversity.

Current IEEE 802.16 subcarrier permutations can be summarized in the following 3 steps:

Suppose that there are $L_{DRU,FPi}$ DRUs in frequency partition i. There are $L_{DRU,FPi} * L_{SP,l}$ data tone pairs per OFDMA symbol in those DRUs, where $L_{SP,l}$ denotes the number of data subcarrier-pairs in the $l^{th}$ symbol within a DRU Renumber those data tone pairs as $RSP_{FPi,l}[u]$, where 1 is OFDMA symbol index in the subframe and $0 \leq u \leq L_{DRU,FPi} * L_{SP,l}$.

Apply the subcarrier permutation formula in the following to generate the s-th DLRU, $0 \leq s < L_{DRU,FPi}$, $SP^{FPi}_{LRUs,l}[m] = RSP_{FPi,l}[k]$, where:

m is the subcarrier pair index, $0 \leq m < L_{SP,l}$, and
$k = L_{DRU,FPi} * f(m,s) + g(PermSeq(\ )s,m,l)$
$f(m,s) = (m + 13 * s) \bmod L_{SP,l}$
$g(PermSeq(\ )s,m,l) = \{PermSeq[(f(m,s) + s + 1) \bmod_{DRU,FPi}] + DL\_PermBase\} \bmod L_{DRU,FPi}$.

The permutation equation is slightly different for different symbols because the symbol index 1 is part of the function g( ), which does not contribute as much as the first term of the equation to calculate k. The resulting diversity order of some 802.16m channels is much lower than it should be. In some pathological cases, many of the downlink (DL) control channels have no diversity at all, causing severe performance degradation.

Embodiments of the present invention remedy this issue, to make the permutation equation generate more drastically different tone-selection results for different symbols. Although not limited in this respect, an exemplary embodiment reduces the impact on the current permutation process and provides f(m,s) from the above 802.16 equation changed to $f(m,s) = (m + 13 * (s + 1)) \bmod L_{SP,l}$.

This change effectively makes the tone-selection results very different for different symbols. Therefore if a channel has only a few tones per symbol, the frequency diversity order can still be increased by forming the channels over different symbols.

Looking now at the figures, it is illustrated that this remedy successfully improves the frequency diversity order for small physical channels that take less than one resource unit. FIG. 1, shown generally as 100, provides an example of a distributed resource unit based on IEEE P802.16m/D2 subcarrier permutation. The graph is shown as frequency 150 vs. time 140. The blocks are shown as DRU 0 tone-pair 105; DRU 1 tone-pair 110; and DRU 2 tone-pair 120; and DRU 3 tone-pair 130. It can be seen in FIG. 1 the lack of diversity.

Figure 2:
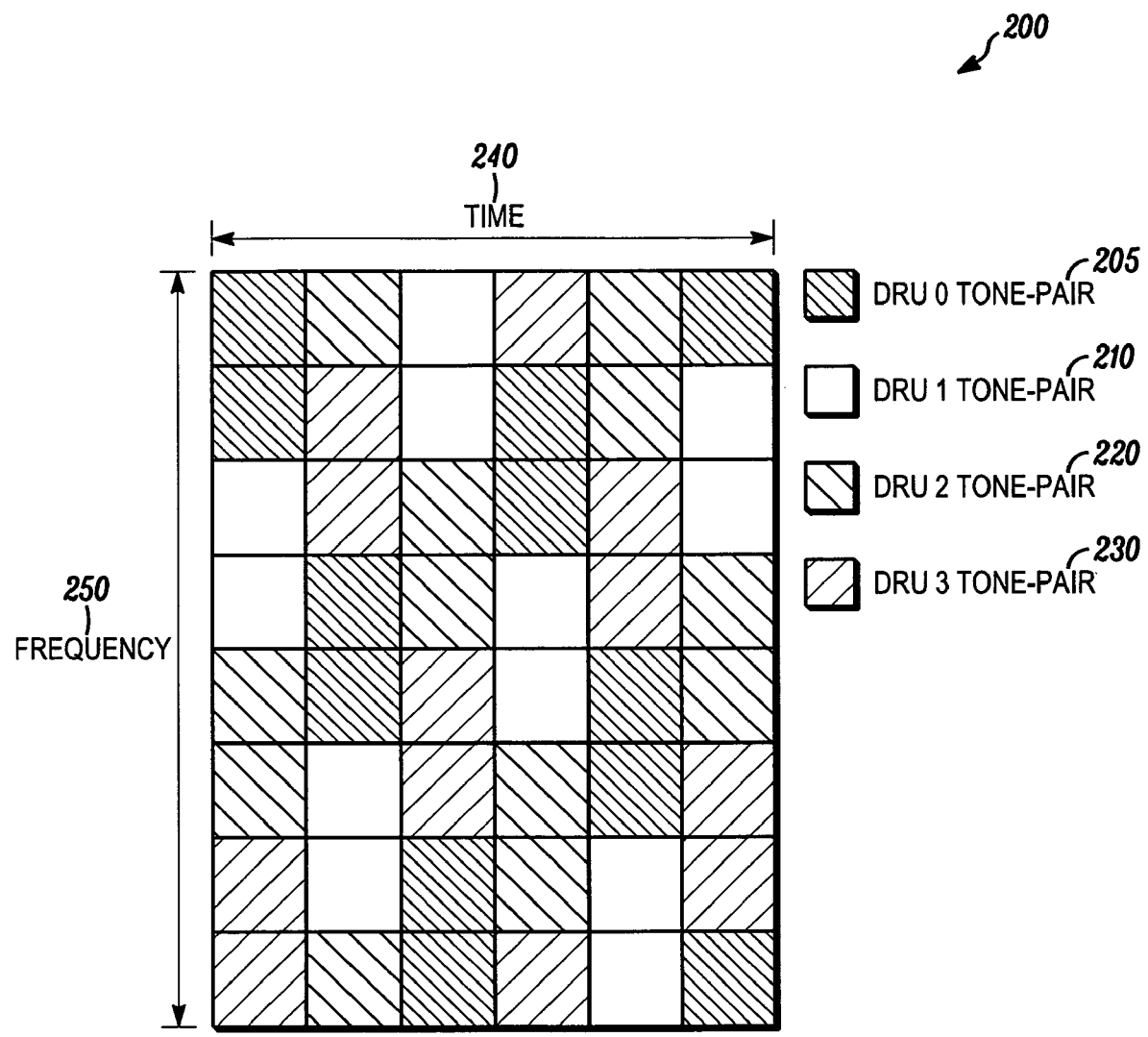
FIG. 2 shows an example of a distributed resource unit based on the subcarrier permutation according to embodiments of the present invention.

Turning to FIG. 2, shown generally as 200, shows an example of a distributed resource unit based on the subcarrier permutation according to embodiments of the present invention. The graph again is shown as frequency 250 vs. time 240. The blocks are shown as DRU 0 tone-pair 205; DRU 1 tone-pair 210; and DRU 2 tone-pair 220; and DRU 3 tone-pair 230. As can be seen from this graph, embodiments of the present invention enable improved subcarrier permutation to achieve high frequency diversity.

In an embodiments of the present invention, an 802.16 MS and applications are collocated in a mobile user terminal, such as, but not limited to mobile phone, laptop, PDA etc. Both MS and BS may utilize transceivers that operate according to the embodiments set forth herein.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method of improving subcarrier permutation to achieve high frequency diversity of OFDMA systems in wireless networks, comprising:

introducing different tone selections for different OFDMA symbols in distributed resource units (DRUs) in a frequency partition, such that a DRU in the frequency partition has sufficient frequency diversity if a channel has only a few tones in each OFDMA symbol of the DRU, wherein the subcarrier permutation uses a permutation equation $f(m,s)$ that changes to $f(m,s)=(m+13*(s+l))$ mod $L_{SP,l}$, wherein m is a subcarrier pair index where $0 \leq m < L_{SP,l}$, $L_{SP,l}$ denotes the number of data subcarrier-pairs in the $l^{th}$ symbol within the DRU, l is a symbol index, s is a distributed logical resource unit (DLRU) where $0 \leq s < L_{DRU,FPi}$, $L_{DRU,FPi}$ number of distributed resource units (DRUs) in each frequency partition i, thereby making tone-selection results different for different OFDMA symbols; and communicating the DRUs with one of a mobile station (MS) and a base station (BS).

2. The method of claim 1, wherein said wireless network conforms to an Institute for Electronic and Electrical Engineering IEEE P802.16m/D2 standard.

3. The method of claim 2, further comprising making a permutation equation set forth in said 802.16m/D2 standard generate different tone-selection results for different symbols wherein at least one half of the data tone pairs of the DRUs are renumbered into a different frequency.

4. A mobile station (MS), comprising:

a transceiver configured for communication with a base station (BS) in a wireless network, said transceiver further adapted to improve subcarrier permutation to achieve high frequency diversity of OFDMA systems in wireless networks by introducing different tone selections for different OFDMA symbols in distributed resource units (DRUs) in a frequency partition, such that a DRU in the frequency partition has sufficient frequency diversity if a channel has only a few tones in each OFDMA symbol of the DRU, wherein the subcarrier permutation uses a permutation equation $f(m,s)$ that changes to $f(m,s)=(m+13*(s+l))$ mod $L_{SP,l}$, wherein m is a subcarrier pair index where $0 \leq m < L_{SP,l}$, $L_{SP,l}$ denotes the number of data subcarrier-pairs in the $l^{th}$ symbol within the DRU, l is a symbol index, s is a distributed logical resource unit (DLRU) where $0 \leq s < L_{DRU,FPi}$, $L_{DRU,FPi}$ number of distributed resource units (DRUs) in each frequency partition i, thereby making tone-selection results different for different OFDMA symbols.

5. The MS of claim 4, wherein said wireless network conforms to an Institute for Electronic and Electrical Engineering (IEEE) 802.16m/D2 standard.

6. The MS of claim 5, wherein said transceiver is further adapted to make a permutation equation set forth in said 802.16m/D2 standard to generate different tone-selection results for different symbols wherein at least one half of the data tone pairs of the DRUs are renumbered into a different frequency.

7. A base station (BS), comprising:

a transceiver configured for communication with a mobile station (MS) in a wireless network, said transceiver further adapted to improve subcarrier permutation to achieve high frequency diversity of OFDMA systems in wireless networks by introducing different tone selections for different OFDMA symbols in distributed resource units (DRUs) in a frequency partition, such that a DRU in the frequency partition has sufficient frequency diversity if a channel has only a few tones in each OFDMA symbol of the DRU, wherein the subcarrier permutation uses a permutation equation $f(m,s)$ that changes to $f(m,s)=(m+13*(s+l))$ mod $L_{SP,l}$, wherein m is a subcarrier pair index where $0 \leq m < L_{SP,l}$, $L_{SP,l}$ denotes the number of data subcarrier-pairs in the $l^{th}$ symbol within the DRU, l is a symbol index, s is a distributed logical resource unit (DLRU) where $0 \leq s < L_{DRU,FPi}$, $L_{DRU,FPi}$ number of distributed resource units (DRUs) in each frequency partition i, thereby making tone-selection results different for different OFDMA symbols.

8. The BS of claim 7, wherein said wireless network conforms to an Institute for Electronic and Electrical Engineering (IEEE) 802.16m/D2 standard.

9. The BS of claim 8, wherein said transceiver is further adapted to make a permutation equation set forth in said 802.16m/D2 standard to generate different tone-selection results for different symbols wherein at least one half of the data tone pairs of the DRUs are renumbered into a different frequency.

10. A non-transitory computer readable medium encoded with computer executable instructions, which when accessed, cause a machine to perform operations comprising:

determining subcarrier permutation to achieve high frequency diversity of OFDMA systems in wireless networks by introducing different tone selections for different OFDMA symbols in distributed resource units (DRUs) in a frequency partition, such that a DRU in the frequency partition has sufficient frequency diversity if a channel has only a few tones in each OFDMA symbol of the DRU, wherein the subcarrier permutation uses a permutation equation $f(m,s)$ that changes to $f(m,s)=(m+13*(s+l))$ mod $L_{SP,l}$, wherein m is a subcarrier pair index where $0 \leq m < L_{SP,l}$, $L_{SP,l}$ denotes the number of data subcarrier-pairs in the $l^{th}$ symbol within the DRU, l is a symbol index, s is a distributed logical resource unit (DLRU) where $0 \leq s < L_{DRU,FPi}$, $L_{DRU,FPi}$ number of distributed resource units (DRUs) in each frequency partition i, thereby making tone-selection results different for different OFDMA symbols.

11. The computer readable medium of claim 10, wherein said wireless network conforms to an Institute for Electronic and Electrical Engineering (IEEE) 802.16m standard.

12. The computer readable medium encoded with computer executable instructions of claim 11, further comprising further instructions which cause a machine to perform further operations comprising making a permutation equation set forth in said 802.16m standard to generate different tone-selection results for different symbols wherein at least one half of the data tone pairs of the DRUs are renumbered into a different frequency.

* * * * *